(12) United States Patent
Thien et al.

(10) Patent No.: US 11,284,177 B2
(45) Date of Patent: Mar. 22, 2022

(54) AUTOMATIC IDENTIFICATION OF A WIRELESS MICROPHONE, A BODY-PACK TRANSMITTER OR A BODY-PACK RECEIVER

(71) Applicant: Sennheiser electronic GmbH & Co. KG, Wedemark (DE)

(72) Inventors: Stefan Thien, Hannover (DE); Kai Tossing, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 17/089,880

(22) Filed: Nov. 5, 2020

(65) Prior Publication Data

US 2021/0051386 A1 Feb. 18, 2021

Related U.S. Application Data

(63) Continuation of application No. 16/542,541, filed on Aug. 16, 2019, now Pat. No. 10,863,258.

(30) Foreign Application Priority Data

Aug. 22, 2018 (DE) .......................... 102018120455.8

(51) Int. Cl.
*H04R 1/08* (2006.01)
*H04R 3/00* (2006.01)

(52) U.S. Cl.
CPC .................. *H04R 1/08* (2013.01); *H04R 3/00* (2013.01); *H04R 2420/07* (2013.01)

(58) Field of Classification Search
None
See application file for complete search history.

(56) References Cited

U.S. PATENT DOCUMENTS

2005/0130717 A1 6/2005 Gosieski, Jr. et al.

*Primary Examiner* — Kenny H Truong
(74) *Attorney, Agent, or Firm* — Haug Partners LLP

(57) ABSTRACT

For mobile devices used in a wireless audio transmission system, for example for stage technology, like wireless microphones, body-pack transmitters with an audio input, and body-pack receivers with an audio output, electronic displays are known, on which a respective radio frequency or radio channel in use or other alphanumeric information is displayed. This information can be input at the transmitting end, for example, at a central location like a mixing desk. The displays, however, only function while the mobile devices are switched on so that it is not possible to see the association(s) of the mobile device(s) in their switched-off state. For improved identification of wireless microphones, body-pack transmitters, or body-pack receivers in which an automatic alphanumeric identification of the transmission channel in use is displayed in the switched-on state, according to the invention the display of the identification is retained even after the microphone, body-pack transmitter or body-pack receiver is switched off. In this way, mobile devices can be associated with a radio transmission path, an artist or a stage position even in the switched-off state.

20 Claims, 2 Drawing Sheets

AUTOMATIC IDENTIFICATION OF A WIRELESS MICROPHONE, A BODY-PACK TRANSMITTER OR A BODY-PACK RECEIVER

The present application is a Continuation of U.S. patent application Ser. No. 16/542,541 filed on Aug. 16, 2019, which claims benefit of foreign priority from of German Patent Application No. 10 2018 120 455.8, filed on Aug. 22, 2018, the disclosures of which are incorporated herein by reference in their entirety.

FIELD OF THE INVENTION

The invention concerns an automatic identification of a wireless microphone, a body-pack transmitter having an audio input or a body-pack receiver for audio playback by way of an earphone, as well as a corresponding method.

BACKGROUND

Wireless audio transmission systems for stage equipment usually include a plurality of mobile devices like wireless microphones, body-pack transmitters with an audio input for microphones or guitar pickups as well as body-pack receivers with audio output, for example for in-ear monitors. In that respect the various mobile devices use different radio channels or radio frequencies.

Normally the wireless microphones, body-pack transmitters and body-pack receivers which are being used at the same time are fixedly associated with different artists, instruments or stage positions and are correspondingly individually programmed. That includes for example so-called pairing with a fixed transmitter or receiver at a counterpart or base station. That association which often requires frequency planning is also important for connection to a mixing desk and is set up and tested in a sound check which is usually carried out several hours before a stage appearance. As the wireless microphones, body-pack transmitters and body-pack receivers which are being used at the same time generally respectively look alike they can contain electronic displays (for example LCD, LED) on which the respective radio frequency or radio channel being used or other alphanumeric information is displayed (for example the name of the artist with which the device is associated, or a position like for example "Background 1", "Background 2" and so forth). In that way the pre-programmed mobile devices can be more easily associated with the corresponding artist or instrument upon appearing.

In that respect however there is the problem that the displays only function, and thus the association can only be recognized, when the mobile devices are switched on. Frequently however, between the sound check and the appearance, the mobile devices are frequently switched off and gathered up, for example for secure safekeeping or for charging up the batteries. Admittedly each mobile device internally stores the displayed information, but that cannot be seen on the mobile device when it is switched off. When a given mobile device is required under some circumstances all mobile devices have to be switched on in order to obtain the association information and to find the mobile device that is being sought. In practice therefore the mobile devices are often identified by hand-written stickers, which is labor-intensive and prone to error. For example stickers can come loose or be swapped over or the writing can be illegible.

SUMMARY OF THE INVENTION

An object of the present invention is to provide an automatic identification for a mobile audio device like a wireless microphone, a body-pack transmitter with audio input or a body-pack receiver for an earphone.

The invention affords an automated way of attaining the above-specified object.

According to the invention a mobile audio device has a display which even when the power supply is switched off continues to display the last-displayed information at least for some hours. That information includes alphanumeric identification information, for example an identification of the transmission channel being used, by a transmission frequency, a channel number or a text. That ensures, even after the microphone, body-pack transmitter or body-pack receiver is switched off, for example even when changing the battery or battery pack, that the association information remains readable. In addition a specific mobile device which is being sought can be found more easily and more quickly among a number of switched-off mobile devices because the mobile devices do not first have to be all individually switched on in order to be able to read the display.

A wireless microphone according to the invention or a body-pack transmitter according to the invention with an audio output is disclosed. A wireless receiver according to the invention is also disclosed. Further advantageous embodiments are described.

Embodiments further concern an audio transmission system comprising a plurality of mobile devices according to the invention and a corresponding method for automatic identification of a wireless microphone, body-pack transmitter or body-pack receiver by means of a display.

According to an aspect the identification of the transmission channel being used can also be represented by a graphic symbol, like for example a logo. That can be transmitted to the wireless microphone, the body-pack transmitter or body-pack receiver and displayed there on a display which is so designed that the display remains visible even after the device is switched off.

BRIEF DESCRIPTION OF THE DRAWINGS

Further details and advantageous embodiments are shown in the drawings in which.

DETAILED DESCRIPTION OF THE INVENTION

Figure 1:
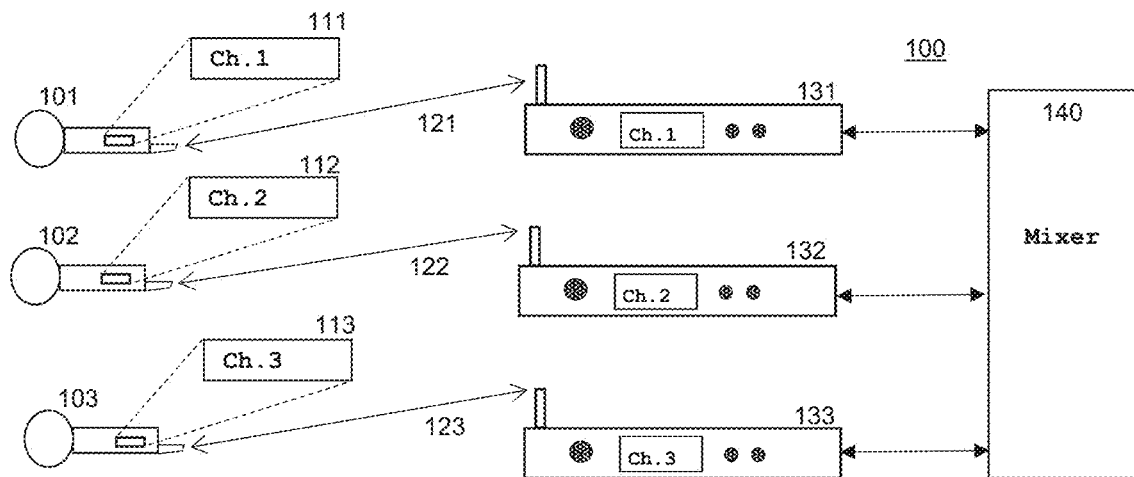
FIG. 1 shows an audio transmission system with three wireless microphone transmission paths.

FIG. 1 shows an audio transmission system 100 having three wireless microphone transmission paths. The wireless microphones 101, 102, 103 are respectively connected to their respective counterpart or base station 131, 132, 133 by way of a radio connection 121, 122, 123, the radio connections using different frequencies or channels. The base stations 131-133 are by way of example connected to a common mixing desk 140. At the mixing desk, the association of its input channels with the microphones 101-103 must be known or recognizable. Each microphone has a display 111-113 for displaying at least one individual item of identification information for the transmission path 121-123, for example the respective radio channel Ch. 1, Ch. 2, Ch. 3. As in this example the respectively associated base station 131-133 also has a display on which the respective radio channel is displayed and each of the base stations, by virtue of a cable connection, can be easily associated with an input channel of the mixing desk 140, each microphone can thus also be easily associated with an input channel on the mixing desk 140. When setting up or initializing the audio transmission system 100 inter alia the base stations 131-133 are associated with the input channel on the mixing desk, the wireless microphones are associated with the base stations (pairing) and the transmission paths have their radio frequencies allotted to them. That association can be different for each system setup, even if the same devices are used, because for example the reception conditions, the allowed and the free radio frequencies or radio channels can respectively differ. After system setup and initialization each wireless microphone has its individual identification information. The identification information ultimately stems from the respective base station or the mixing desk. In that situation the information can be transmitted from the base station to the wireless microphone so that the latter displays the information. For that purpose it is possible to use the above-mentioned radio path 121-123 or another connection, for example an infra-red (IR) or similar connection which is only used for the pairing operation. The information can also serve for configuration of the transmitter contained in the wireless microphone and which makes use of the radio path 121-123 and can also be used for the display on the display 111-113. According to the invention the display 111-113 displays the identification information not just in the switched-on state but the display is maintained even when the wireless microphone is switched off.

As an alternative to the arrangement shown in FIG. 1 with separate base stations it is also possible for two or more or all wireless microphones 101-103 to communicate with a single base station by way of radio connections. In that case the wireless microphones can also use the same frequencies or channels, for example by way of time multiplex.

Figure 2:
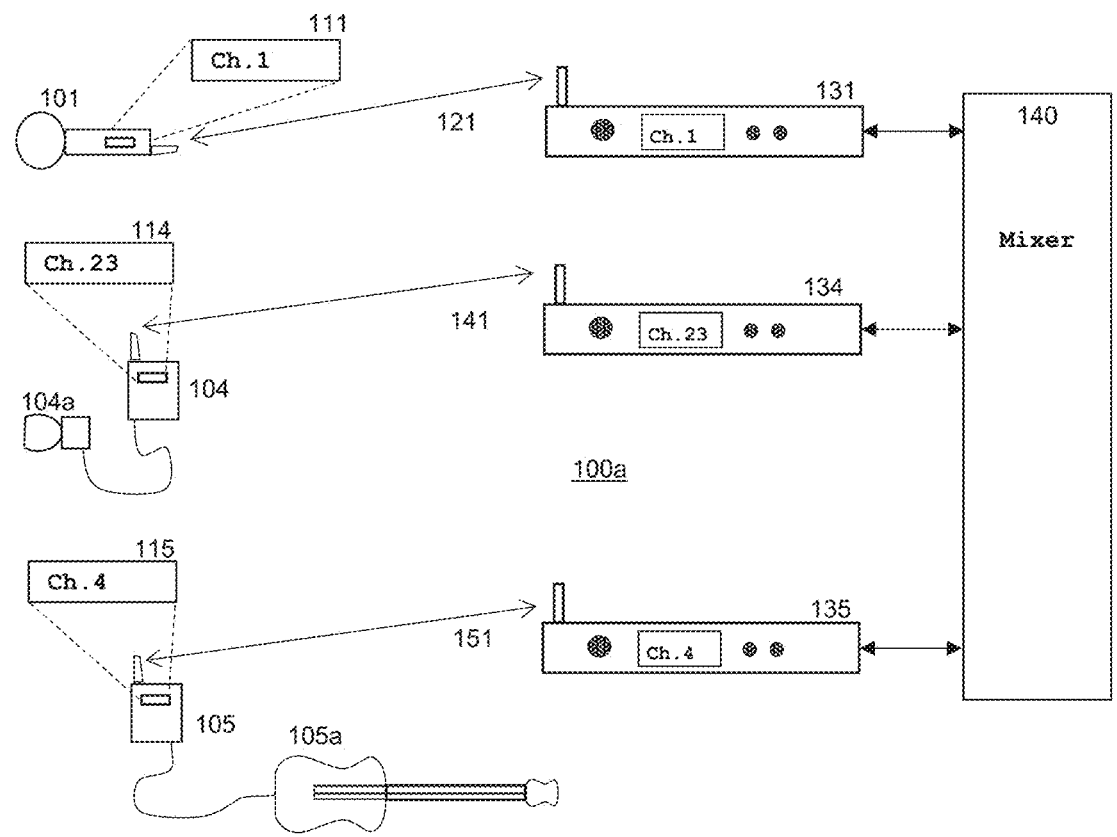
FIG. 2 shows an audio transmission system with one wireless microphone path, a body-pack receiver for an in-ear monitor and a body-pack transmitter for a guitar pickup.

FIG. 2 shows a similar audio transmission system 100*a* which however includes only one wireless microphone 101 and a body-pack receiver 104 for an in-ear monitor 104*a* and a body-pack transmitter 105 for an instrument pickup (for example a guitar pickup) 105*a*. The body-pack receiver 104 and the body-pack transmitter 105 are also referred to as the "body-pack". Unlike the audio transmission system 100 in FIG. 1 here radio paths 121, 141, 151 are used for audio data transmission not only from the mobile devices 101, 105 to the respective base station 131, 135 which can possibly pass the audio data on to the mixing desk 140, but in the case of the body-pack receiver they are also used for audio data transmission from a base station 134 to the associated mobile device 104. The base station 134 can receive the audio data from the mixing desk 140. Here too the mobile devices 101, 104, 105 have displays 111, 114, 115 on which individual identification for the respective radio connection is displayed, more specifically both when the mobile device is switched on and also when it is switched off. When the mobile device is switched on the display can be updated while when the mobile device is switched off the information last displayed before it was switched off remains visible in the display 111, 114, 115. Alternatively, after the device is switched off, other pre-configured information can also be displayed in the display 111, 114, 115.

Instead of the channel numbers illustrated by way of example in FIGS. 1 and 2 the individual identification information can also include radio frequencies or other individual alphanumeric text or a graphic representation like a symbol, an icon, a photograph and so forth. The individual alphanumeric text or the graphic can be input directly at the mobile device, at the respective base station or at the mixing desk or can be retrieved from a memory. In an embodiment the base stations or the mixing desk have a comparison unit which receives the individual alphanumeric texts or graphics, compares them together and displays or prevents double allocation so that a unique association is possible. FIGS. 1 and 2 also show by way of example that in many cases substantially more mobile devices are connected, in which case however the principle described hereinbefore is used. Particularly in the case of extensive audio transmission systems with numerous mobile devices it is advantageous that the individual mobile devices according to the invention can be distinguished from each other even in the state of being switched off.

Figure 3:
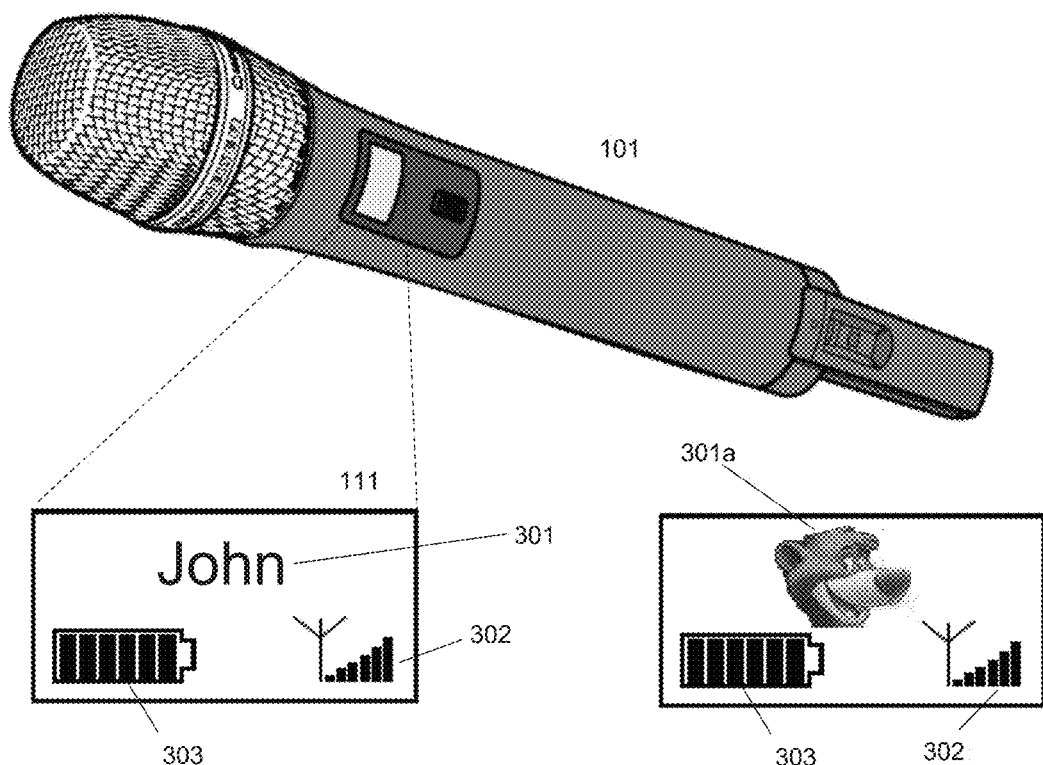
FIG. 3 shows a wireless microphone according to the invention with an alphanumeric or graphical display in the switched-on and switched-off state.

FIG. 3 shows a wireless microphone 101 having a display 111 for alphanumeric or graphical display, wherein the display in the display device is set to a current configuration in the switched-on state and is retained in the switched-off state. In this example individual identification information which can be input at the base station or a central location, for example at a mixing desk, can be transmitted to the microphone by way of a wireless duplex connection. The display in the display 111 includes that individual identification information, for example a name 301 of a singer with whom the microphone is associated, or a graphic symbol 301*a* which for example represents a role in a performance. In addition the display contains a symbol 302 in respect of the quality of the wireless connection to the base station (for example receiving field strength of the duplex connection) and a symbol 303 for the battery charge state. At least the individual identification information 301, 301*a* remains visible as identification in the display when the microphone is switched off. Depending on the respective design and display technology the entire display continues to be maintained after the microphone is switched off.

In an embodiment the electronic display retains the last-displayed identification without a power feed after the device is switched off and continues to display it. In that case the display of the mobile device can be in the form of so-called electronic paper (e-paper, e-ink), that is to say a passive display based on the principle of electrophoresis. In that case microcells which contain positively and negatively charged light and dark particles respectively serve as pixels of the display. When the display is switched on the microcells are exposed to an electric field, in which case depending on the polarity of the field the light or the dark particles move to the visible side of the microcell and cause the pixel to appear either as light or dark. Each pixel of the display can be made separately light or dark by individual actuation of the electric field for each microcell. If the mobile device and therewith the display are switched off the particles remain at their position so that the last-displayed information continues to be displayed for a very long time in the display. With the currently known electronic paper the display can continue to be displayed for several days.

In another embodiment the electronic display has a dedicated power supply which can adequately supply the display with power for at least several hours in order to display the identification. In that case the display can be for example in the form of a power-saving liquid crystal display (LCD) or the like, which has a dedicated power supply like for example a capacitor, with which the displayed information is maintained for at least several hours.

Figure 4:
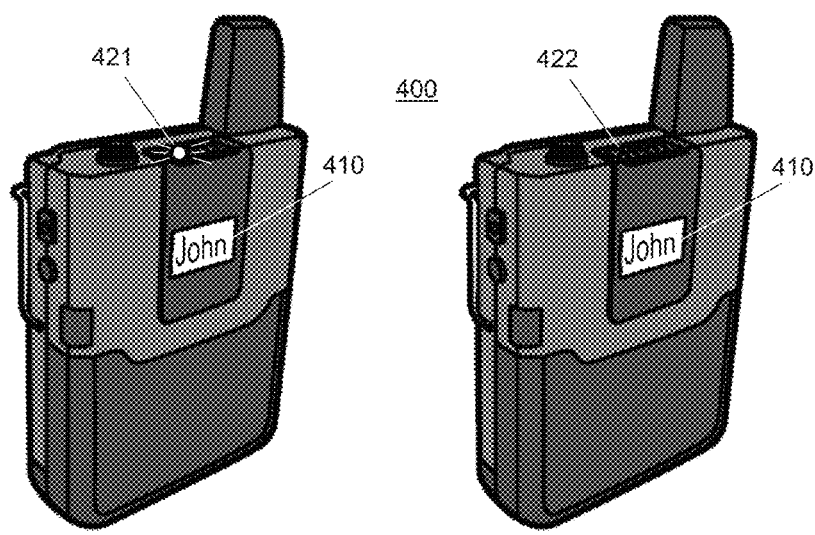
FIG. 4 shows a body-pack transmitter according to the invention with an alphanumeric display in the switched-on and switched-off state.

In an embodiment the invention concerns a mobile wireless transmitter (body-pack transmitter) within an audio transmission system, wherein the transmitter has a display for representing an automatic alphanumeric identification of the wireless connection being used, and wherein the identification is displayed at the switched-on transmitter and wherein the display of the identification continues to remain visible even when the transmitter is switched off. Such a body-pack transmitter is shown in FIG. 4 (without the microphone or instrument pickup to be connected thereto). On the left-hand side an illuminated status LED 421 on the body-pack transmitter 400 shows that the body-pack transmitter is switched on. The display 410 displays current alphanumeric text, in this case the name, input at the base station, of the artist with whom the body-pack transmitter is associated. Upon a change in the information, for example re-programming or re-configuring of the audio transmission system, the displayed alphanumeric text can also change. When the body-pack transmitter is switched off, as indicated at the right by a switched-off status LED 422, the alphanumeric text still remains readable in the display 410. The alphanumeric text can also be for example a number, a letter or a symbol for identifying the mobile body-pack transmitter or the wireless connection associated therewith.

In another embodiment the invention concerns a mobile wireless receiver (body-pack receiver) within an audio transmission system, wherein the receiver has a display for representing an automatic alphanumeric identification of the wireless connection in use. The identification is displayed at the switched-on receiver and the display of the identification is maintained visible even after the receiver is switched off. Externally such a body-pack receiver can look for example like the body-pack transmitter shown in FIG. 4 or very similar.

In similar embodiments the identification includes a graphic symbol which is displayed on a display device. The identification can also include a color if the display is a colored display and preferably retains the displayed color even after the body-pack transmitter or the receiver is switched off. The symbol and/or the color can be input or selected at a base station connected to the mobile device (body-pack transmitter or receiver). The mobile device can have a reception interface in order thereby to receive data for determining a radio transmission channel used by the mobile device and to correspondingly set its radio interface. In addition the reception interface can receive the identification data for the respective mobile device, which are then displayed as an alphanumeric or graphic identification. In addition the reception interface can also receive further data or use only a part of the transmitted identification data for display purposes. In particular it can be the case that the identification information displayed at the switched-on microphone, body-pack transmitter or body-pack receiver involves only a part of the transmitted identification information while the identification information displayed after the mobile device is switched off in accordance with a pre-configuration includes at least another part of the transmitted identification data. In an embodiment the reception interface wirelessly receives the data from the same base station to which the mobile device (in the case of the body-pack transmitter) sends audio data or from which it receives audio data (in the case of the body-pack receiver). In another variant however it is also possible for the reception interface to receive the data from another base station wirelessly or in contact-connected relationship, for example a central configuration unit for a wireless audio transmission system.

In a further embodiment the invention concerns an audio transmission system having a plurality of wireless mobile transmitters and/or receivers, wherein the transmitters and/or receivers each have a respective display for representing an automatic alphanumeric or graphic identification of the respective wireless connection in use. In that case the identification is displayed at the switched-on transmitter and/or receiver and the display of the identification remains visible even when the transmitter and/or receiver is switched off.

In a further embodiment the invention concerns a method of automatic identification of a wireless microphone, body-pack transmitter or body-pack receiver by means of an automatic display, wherein the display displays an item of identification information and wherein the displayed identification information is maintained visible on the display even when the microphone, body-pack transmitter or body-pack receiver is switched off. In that way even the switched-off microphone or the switched-off body-pack transmitter or body-pack receiver can be associated without first having to be switched on.

The invention is advantageous for stage hands, for example stage technicians and artists, but also renters and users of wireless audio transmission systems.

The displayed information can for example also include device-specific values for management and identification of the device like the current or last IP address of the device, the current firmware version or the network host name. In this way the invention can be advantageously used in particular also for system integrators or IT integrators.

The invention claimed is:

1. A wireless receiver for audio playback via an earphone,
wherein the wireless receiver is configured to receive data from a base station via a wireless transmission channel, and
wherein the wireless receiver comprises a display for displaying an identification of the transmission channel in use,
wherein the identification was entered at the base station or at a device connected to the base station and was transmitted to the wireless receiver,
wherein the identification is displayed while the wireless receiver is switched on, and
wherein the display of the identification is retained when the wireless receiver is switched off.

2. The wireless receiver as set forth in claim 1,
wherein the display is an electronic display that is configured to retain and continue to display a last displayed identification without power supply.

3. The wireless receiver as set forth in claim 1,
wherein the display is an electronic display that has a dedicated power supply configured to provide the electronic display with sufficient power for displaying the identification for at least a plurality of hours.

4. The wireless receiver as set forth in claim 1,
wherein the wireless receiver is connected to the base station via a wireless transmission channel in a duplex connection.

5. The wireless receiver as set forth in claim 1,
wherein the identification comprises alphanumeric identification.

6. The wireless receiver as set forth in claim 5,
wherein the alphanumeric identification comprises a radio frequency or a radio channel of the wireless transmission.

7. The wireless receiver as set forth in claim 5,
wherein the alphanumeric identification comprises a name of IP address.

8. The wireless receiver as set forth in claim 1,
wherein the identification comprises at least one graphic symbol.

9. The wireless receiver as set forth in claim 8,
wherein the at least one graphic symbol is an image or logo.

10. The wireless receiver as set forth in claim 1,
wherein the identification is stored at the base station and can be re-transmitted when the wireless receiver is switched on again.

11. The wireless receiver as set forth in claim 1,
wherein the wireless receiver is configured to receive audio data via a wireless first transmission channel from the base station and configuration data via a second transmission channel,
wherein the configuration data are suitable for determining the first transmission channel and comprise said identification data for the first transmission channel.

12. An audio transmission system comprising one or more mobile devices and at least one base station,
wherein the one or more mobile devices are wireless receivers,
wherein the wireless receivers are configured to receive data from the at least one base station via at least one individual wireless transmission channel each, the data comprising audio data and individual identification information for the wireless transmission channel in use, and
wherein the wireless receivers each comprise a display for displaying the received individual identification information,
wherein the identification information was entered at the at least one base station or at a device connected to the at least one base station and was transmitted to the respective wireless receiver,
wherein the received identification information is displayed at the wireless receiver while the wireless receiver is switched on, and
wherein the display of the received identification information is retained when the wireless receiver is switched off.

13. The audio transmission system as set forth in claim 12, further comprising at least one further mobile device, the at least one further mobile device being a wireless microphone or wireless body-pack transmitter and having a display,
wherein the at least one further mobile device is configured to receive individual identification information from the at least one base station via at least one wireless transmission channel and to display the received identification information on said display,
wherein the identification information was entered at the at least one base station or at a device connected to the at least one base station and was transmitted to the respective further mobile device,
wherein the received identification information is displayed at the further mobile device while the further mobile device is switched on, and
wherein the display of the received identification information is retained when the further mobile device is switched off.

14. A method for automatic identification of a wireless body-pack receiver by means of a display displaying identification information, the method comprising:

connecting the body-pack receiver via a radio connection to a base station;
receiving, via the radio connection, identification information at the body-pack receiver, wherein the identification information was previously input at the base station or at a device connected to the base station and wherein the identification information is specific to the respective body-pack receiver;
displaying the identification information on an electronic display of the body-pack receiver while the body-pack receiver is switched on,
wherein the displayed identification information is visibly retained on the display when the microphone, body-pack transmitter or body-pack receiver is switched off.

15. The method as set forth in claim 14,
wherein the identification information comprises at least one graphic symbol.

16. The method as set forth in claim 14,
wherein the identification information displayed after switching off is a last identification information that was displayed before switching off.

17. The method as set forth in claim 14,
wherein the identification information displayed at the body-pack receiver when switched on comprises only a part of the transmitted identification information, and
wherein the identification information displayed after switching off comprises at least a pre-configured other part of the transmitted identification information.

18. The method as set forth in claim 14,
wherein the body-pack receiver is connected to the base station via a radio transmission channel in a duplex connection.

19. The method as set forth in claim 14,
wherein the body-pack receiver is connected to the base station via a respective radio transmission channel for each direction, and wherein the identification information relates to one of the two transmission channels.

20. An audio transmission system comprising at least two mobile devices, at least one base station and at least one central control unit,
wherein the at least two mobile devices are wireless receivers,
wherein each wireless receiver is configured to receive audio data via a wireless first transmission channel and configuration data via a second transmission channel,
wherein the configuration data are suitable for determining the first transmission channel and comprise identification data for the first transmission channel, and
wherein each wireless receiver comprises a display for displaying an identification in accordance with the identification data,
wherein the identification data comprises at least a name or a graphic symbol and was entered at a base station or at a device connected to the base station and was transmitted to the wireless receiver,
wherein the identification is displayed while the wireless receiver is switched on, and
wherein the display of the identification is retained when the wireless receiver is switched off,
wherein the data for determining the radio transmission channel used by the respective transmitter and the identification data for the radio transmission channel are transmitted from the central control unit to each of the mobile devices and are different for each of the mobile devices, and wherein the identification data represent an individual name or an individual graphic symbol for each of the mobile devices.

\* \* \* \* \*